US011050068B2

(12) United States Patent
Yamaguchi et al.

(10) Patent No.: US 11,050,068 B2
(45) Date of Patent: Jun. 29, 2021

(54) ION EXCHANGER

(71) Applicant: TOYODA GOSEI CO., LTD., Kiyosu (JP)

(72) Inventors: Naoki Yamaguchi, Kiyosu (JP); Kosuke Kusaba, Kiyosu (JP); Tatsuya Ojio, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 291 days.

(21) Appl. No.: 15/819,240

(22) Filed: Nov. 21, 2017

(65) Prior Publication Data

US 2018/0145349 A1      May 24, 2018

(30) Foreign Application Priority Data

Nov. 22, 2016  (JP) .............................. JP2016-226638

(51) Int. Cl.
  *H01M 8/04044* (2016.01)
  *B01D 15/36* (2006.01)
  (Continued)

(52) U.S. Cl.
  CPC ........ *H01M 8/04044* (2013.01); *B01D 15/14* (2013.01); *B01D 15/362* (2013.01);
  (Continued)

(58) Field of Classification Search
  CPC .. B01J 47/024; C02F 2301/043; B01D 15/14; B01D 15/362; B01D 15/363;
  (Continued)

(56) References Cited

U.S. PATENT DOCUMENTS 1,987,847 A  *  1/1935  Flood ................... B01D 27/005
                                                165/119
3,682,308 A  *  8/1972  Moon ................... B01D 35/153
                                                123/41.01
(Continued)

FOREIGN PATENT DOCUMENTS

JP       2003249249 A  *  9/2003  ............. Y02E 60/50
JP       2010-192225 A       9/2010
(Continued)

OTHER PUBLICATIONS

U.S. Appl. No. 15/638,754, filed Jun. 30, 2017, Yamaguchi et al., (corresponding to JP 2016-133276).

*Primary Examiner* — Bobby Ramdhanie
*Assistant Examiner* — Denise R. Anderson
(74) *Attorney, Agent, or Firm* — Posz Law Group, PLC

(57) ABSTRACT

An ion exchanger used in a cooling system of a fuel cell system, includes: a communicating tube portion including a first flow path which allows coolant introduced from one side to pass therethrough to the other side; a case portion which is provided to communicate with the communicating tube portion; and a storage body which is assembled to the case portion, has a second flow path in which a part of the coolant branches and flows from the communicating tube portion, and is merged with the communicating tube portion again, and stores an ion exchange resin in the second flow path, wherein: an assembled state of the storage body with respect to the case portion is changeable into a plurality of kinds; and a proportion of the coolant that flows to the second flow path is changeable by changing the assembled state of the storage body.

6 Claims, 7 Drawing Sheets

(51) Int. Cl.
*B01D 15/14* (2006.01)
*H01M 8/04029* (2016.01)
*H01M 8/1018* (2016.01)

(52) U.S. Cl.
CPC ...... *B01D 15/363* (2013.01); *H01M 8/04029* (2013.01); *H01M 2008/1095* (2013.01); *H01M 2250/20* (2013.01)

(58) Field of Classification Search
CPC ......... H01M 8/04029; H01M 8/04044; H01M 2008/1095; H01M 2250/20; Y02E 60/50; Y02T 90/40
See application file for complete search history.

(56) References Cited

U.S. PATENT DOCUMENTS

| | | | |
|---|---|---|---|
| 6,264,833 B1 * | 7/2001 | Reamsnyder | F01P 11/06 210/133 |
| 2014/0072894 A1 * | 3/2014 | Mittmann | H01M 8/04723 429/434 |
| 2016/0089618 A1 | 3/2016 | Ogura et al. | |
| 2018/0013155 A1 | 1/2018 | Yamaguchi | |

FOREIGN PATENT DOCUMENTS

| | | | | |
|---|---|---|---|---|
| JP | 2010-198796 A | | 9/2010 | |
| JP | 2011083744 A | * | 4/2011 | ............ Y02E 60/50 |
| JP | 2012-187439 A | | 10/2012 | |
| JP | 2016-064373 A | | 4/2016 | |
| WO | WO-2014174982 A1 | * | 10/2014 | ............... C02F 1/42 |

* cited by examiner

ION EXCHANGER

CROSS-REFERENCE TO RELATED APPLICATION

This application is based upon and claims the benefit of priority from Japanese Patent Application No. 2016-226638, filed on Nov. 22, 2016, the entire contents of which are incorporated herein by reference.

BACKGROUND

Field of the Invention

The present invention relates to an ion exchanger used in a cooling system of a fuel cell system.

Description of the Related Art

In a fuel cell system, when hydrogen and oxygen chemically react to each other in a fuel cell and power generation is performed, the fuel cell generates heat. Therefore, in the fuel cell system, a cooling system is provided which maintains the fuel cell to be at an appropriate temperature during the power generation by circulating coolant.

In the cooling system, when ion concentration in the coolant increases by acid production caused by thermal deterioration of coolant or elution of ions from a pipe component or the like, conductivity of the coolant increases. As a result, there is a concern that electric leakage to the outside from the fuel cell through the coolant is caused. Furthermore, there is also a concern that a generating efficiency of the fuel cell deteriorates.

Meanwhile, in the related art, an ion exchanger which is supposed to suppress rising of ion concentration in coolant is provided in a cooling system of a fuel cell system. The ion exchanger is configured to remove ions contained in the coolant by allowing the coolant to pass through the inside of a case that is filled with an ion exchange resin.

In the ion exchanger, a pressure loss is generated as the coolant passes through an ion exchange resin portion. When the pressure loss increases, a load of a pump that circulates the coolant also increases. Accordingly, power consumption due to the pump increases, and there is a concern that the generating efficiency of the fuel cell deteriorates. Therefore, a low pressure loss is preferable in the ion exchanger.

However, in an initial operation stage of the fuel cell system, since a large number of ions are eluted from a configuration component, such as a pipe, which has just been assembled, an ion elution amount in the cooling system becomes extremely large. Therefore, in the initial stage, since the amount of ions to be exchanged also becomes large, for example, even when the pressure loss is high, it is necessary to allow a large amount of coolant to pass through the ion exchange resin portion, and to increase ion exchange efficiency.

Meanwhile, the ion elution amount from the configuration component, such as a pipe, decreases as time elapses. Therefore, after a predetermined period has elapsed from an operation start of the fuel cell system, the amount caused by thermal deterioration of the coolant takes a large part of the ion elution amount in the cooling system, and it is not necessary to increase the ion exchange efficiency that much.

Therefore, in a case where the ion exchanger having a structure in which a large amount of coolant is allowed to pass through the ion exchange resin portion in accordance with the ion elution amount at the initial stage is employed, even in a state where the ion elution amount after the predetermined period has elapsed is relatively small, there is a concern that a state where the ion exchange efficiency or the pressure loss is higher than necessary is maintained.

Meanwhile, an ion exchanger in which a proportion of the ion exchange efficiency or the pressure loss changes in accordance with an operating load, has also been found (for example, refer to JP-A-2010-198796). In the ion exchanger described in JP-A-2010-198796, a configuration is employed in which a change in flow resistance (pressure loss) is generated by increasing or reducing a capacity of the ion exchange resin through which the coolant passes in accordance with a flow velocity of the coolant.

However, in the configuration described in JP-A-2010-198796, it is necessary to provide a plurality of flow paths that store the ion exchange resin therein, or a mechanism which switches the flow paths in accordance with the flow velocity of the coolant, and there is a concern that the size of the ion exchanger increases and the structure thereof becomes complicated.

SUMMARY

The invention has been made in consideration of the above-described circumstance, and an object thereof is to provide an ion exchanger which can change ion exchange efficiency or a pressure loss while suppressing complexity and enlargement of a structure in a cooling system of a fuel cell system.

Hereinafter, each aspect appropriate for solving the problem will be described by the items. In addition, unique operational effects are additionally remarked in the corresponding aspects as necessary.

According to a first aspect of the invention, there is provided an ion exchanger used in a cooling system of a fuel cell system, including: a communicating tube portion of which both end portions are configured to be respectively connectable to a predetermined pipe of the cooling system, the communicating tube portion including a first flow path which allows coolant introduced from one side to pass therethrough to the other side; a case portion which is provided to communicate with the communicating tube portion; and a storage body which is assembled to the case portion, has a second flow path in which a part of the coolant introduced to the communicating tube portion branches and flows from the communicating tube portion, and is merged with the communicating tube portion again, and stores an ion exchange resin in the second flow path, wherein: an assembled state of the storage body with respect to the case portion is changeable into a plurality of kinds; and a proportion of the coolant that flows to the second flow path is changeable by changing the assembled state of the storage body.

According to the above-described first aspect, the configuration is provided with the communicating tube portion including the first flow path which allows the part of the coolant introduced to the ion exchanger to pass without passing through the ion exchange resin portion; and the storage body (case portion) which has the second flow path in which the part of the coolant branches and flows from the communicating tube portion, and the ion exchange resin is stored in the storage body and the ions contained in the coolant are removed. Accordingly, it is possible to improve ion exchange efficiency while suppressing an increase in pressure loss.

Furthermore, in the aspect, under the above-described configuration, a configuration is employed in which the proportion of the coolant that flows to the second flow path is changeable by changing the assembled state (assembly position or orientation) of the storage body with respect to the case portion.

For example, by setting the assembled state of the storage body to a first assembled state, it is possible to increase the proportion of the coolant that flows to the second flow path (ion exchange resin portion), and by setting the assembled state to a second assembled state, it is possible to reduce the proportion of the coolant that flows to the second flow path.

In other words, by changing the assembled state of the storage body, it is possible to change the performance of the ion exchanger to be in a state where the ion exchange efficiency and the pressure loss are high and to be in a state where the ion exchange efficiency and the pressure loss are low.

Therefore, in the initial operation stage of the fuel cell system in which the ion elution amount increases in the cooling system, the ion exchange efficiency increases by setting the assembled state of the storage body to the first assembled state. Meanwhile, after a predetermined period during which the ion elution amount decreases has elapsed, by changing the assembled state of the storage body when performing periodic inspection, or the like, to the second assembled state, a state where the pressure loss is low can be achieved.

In this manner, according to the aspect, it is possible to change the performance (ion exchange efficiency or pressure loss) of the ion exchanger in accordance with the request that varies depending on the operation time of the fuel cell system.

In particular, in the aspect, since it is not necessary to provide a plurality of flow paths (second flow path) that store the ion exchange resin therein, or it is not necessary to provide a mechanism or the like which switches the plurality of flow paths either, it is possible to reduce the size of the ion exchanger, and to simplify the structure. Furthermore, since it is not necessary to exchange the storage body (cartridge) to an additional product for changing the performance either, it is possible to suppress an increase in number of components, and to save the energy.

According to a second aspect of the invention, an opening area of an inlet port through which the coolant is introduced to the second flow path from the communicating tube portion may be changeable by changing the assembled state of the storage body.

According to the above-described second aspect, by a relatively simple configuration in which the opening area of the inlet port of the second flow path changes, it is possible to change the proportion of the coolant that flows to the second flow path. As a result, it is possible to simplify the structure.

According to a third aspect of the invention, the storage body may have a part assembled to protrude to the inside of the communicating tube portion, and may include the inlet port through which the coolant is introduced from the communicating tube portion to the second flow path at the protruding part and an outlet port through which the coolant is led out to the communicating tube portion from the second flow path.

According to the above-described third aspect, as the inlet port and the outlet port of the second flow path are disposed to be open in the communicating tube portion, it is possible to efficiently introduce the coolant to the second flow path and to lead out the coolant from the second flow path, and to improve the ion exchange efficiency.

According to a fourth aspect of the invention, the assembled state of the storage body may be changeable by rotating the storage body by a predetermined angle regarding an assembling direction of the storage body with respect to the case portion as an axial center.

According to the above-described fourth aspect, only by rotating the storage body by a predetermined angle with respect to the case portion, it is possible to change the proportion of the coolant that flows to the second flow path. As a result, it is possible to simplify the assembly change work, and to simplify the structure.

For example, a configuration can be employed in which the position of the opening portion which serves as the inlet port that introduces the coolant from the communicating tube portion to the second flow path and the position of the opening portion which serves as the outlet port that leads out the coolant from the second flow path to the communicating tube portion can be changed to each other by rotating the storage body by 180° regarding the assembling direction of the storage body as an axial center. Here, for example, when a configuration is employed in which the opening areas of both opening portions vary, it is also possible to realize the configuration according to the above-described Aspect 2 only by changing the positions of both opening portions.

According to a fifth aspect of the invention, a communicating tube portion side end surface of the storage body, which protrudes to the inside of the communicating tube portion, may be disposed to be inclined with respect to a flow path direction of the first flow path.

According to the above-described fifth aspect, since the protrusion amount to the inside of the communicating tube portion varies in a circumferential direction of the storage body, by forming the opening portion which serves as the inlet port or the outlet port of the second flow path on an outer circumferential surface of the protruding part of the storage body, the configuration according to the above-described Aspect 2 can be realized by a relatively simple configuration.

In addition, the opening area of the inlet port of the first flow path is configured to be changeable. When the opening area of the inlet port of the first flow path decreases, the proportion of the coolant that flows to the first flow path decreases, and as much as the decreasing amount, the proportion of the coolant that flows to the second flow path increases. On the contrary, as the opening area of the inlet port of the first flow path increases, the proportion of the coolant that flows to the second flow path decreases. As a result, it is possible to change the proportion of the coolant that flows to the second flow path without changing the opening area of the inlet port of the second flow path.

According to a sixth aspect of the invention, the ion exchanger may further include a protrusion piece which is formed to protrude from the communicating tube portion side end surface of the storage body which protrudes to the inside of the communicating tube portion, and the protrusion piece may be changed between a state of being installed along the flow path direction of the first flow path and a state of being installed along a direction orthogonal to the flow path direction of the first flow path by the change of the assembled state of the storage body.

According to the above-described sixth aspect, by the change of the assembled state of the storage body, the protrusion piece imparts a larger resistance to the coolant that flows in the first flow path or imparts a smaller resistance to the coolant that flows in the first flow path. Here, according to the state where the protrusion piece imparts a larger resistance to the coolant that flows in the first flow path, the proportion of the coolant that flows to the first flow path decreases, and as much as the decreasing amount, the proportion of the coolant that flows to the second flow path increases. As a result, without changing the opening area of the inlet port of the second flow path, it is possible to change the proportion of the coolant that flows to the second flow path.

According to a seventh aspect of the invention, the ion exchanger may further include a movable piece of which one end is pivotally supported to be rotatable and the other end is a free end on the communicating tube portion side end surface of the storage body which protrudes to the inside of the communicating tube portion, and a free end side of the movable piece may be changed between a state of being positioned further on the upstream side of the first flow path than a rotation axis side and a state of being positioned further on the downstream side of the first flow path than the rotation axis side by the change of the assembled state of the storage body.

According to the above-described seventh aspect, in a state where the free end side of the movable piece is positioned further on the upstream side of the first flow path than the rotation axis side, the movable piece is displaced to block the first flow path, and a state where the movable piece imparts a larger resistance to the coolant that flows in the first flow path is achieved. At the same time, a state is achieved where it is possible to introduce a large amount of coolant to the inlet port of the second flow path by the movable piece. Meanwhile, in a state where the free end side of the movable piece is positioned further on the downstream side of the first flow path than the rotation axis side, a state where the movable piece is displaced to open the first flow path, and the resistance imparted to the coolant that flows in the first flow path by the movable piece is smaller, is achieved. As a result, similar to the above-described Aspect 6, without changing the opening area of the inlet port of the second flow path, it is possible to change the proportion of the coolant that flows to the second flow path.

According to an eighth aspect of the invention, the ion exchanger may further include a positioning unit configured to determine a position of the storage body depending on each of the plurality of kinds of assembled states.

According to the above-described eighth aspect, it is possible to prevent a positional shift of the storage body due to vibration or the like, and to maintain the performance of the ion exchanger to be predetermined requested performance.

According to a ninth aspect of the invention, the communicating tube portion may have a shape of a substantially straight line.

Here, a "shape of a substantially straight line" means that the shape is not curved in a U shape or in an L shape, and a case where the pressure loss is substantially large is not included, not being limited to a completely straight line, and a shape which is smoothly bent or curved to the extent that the coolant can smoothly flow is included.

In the ion exchanger of the related art, since a configuration in which the entire amount of introduced coolant passes through the ion exchange resin portion is employed, the pressure loss is extremely large. Meanwhile, in recent years, similar to JP-A-2010-198796, an ion exchanger including a bypass flow path in which a part of the introduced coolant flows bypassing the ion exchange resin portion, is also found.

However, in a case where the bypass flow path is curved in a U shape or in a clamp shape, there is a concern that the pressure loss naturally increases. In addition, in a case where the bypass flow path which bypasses the ion exchange resin portion is provided in the case portion, there is a concern that the size of the ion exchanger increases.

Meanwhile, according to the above-described ninth aspect, by providing the communicating tube portion (first flow path) in a shape of a substantially straight line, it is possible to allow a part of the coolant introduced to the ion exchanger to pass straight forward without passing through the ion exchange resin portion, and to lead out the coolant from the ion exchanger with the shortest distance. As a result, it is possible to make the pressure loss to be extremely small. In addition, it is not necessary to provide the bypass flow path which bypasses the ion exchange resin portion in the case portion, it is possible to further shorten the length of the communicating tube portion, and thus, it is possible to reduce the size of the ion exchanger.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

First Embodiment

Figure 1:
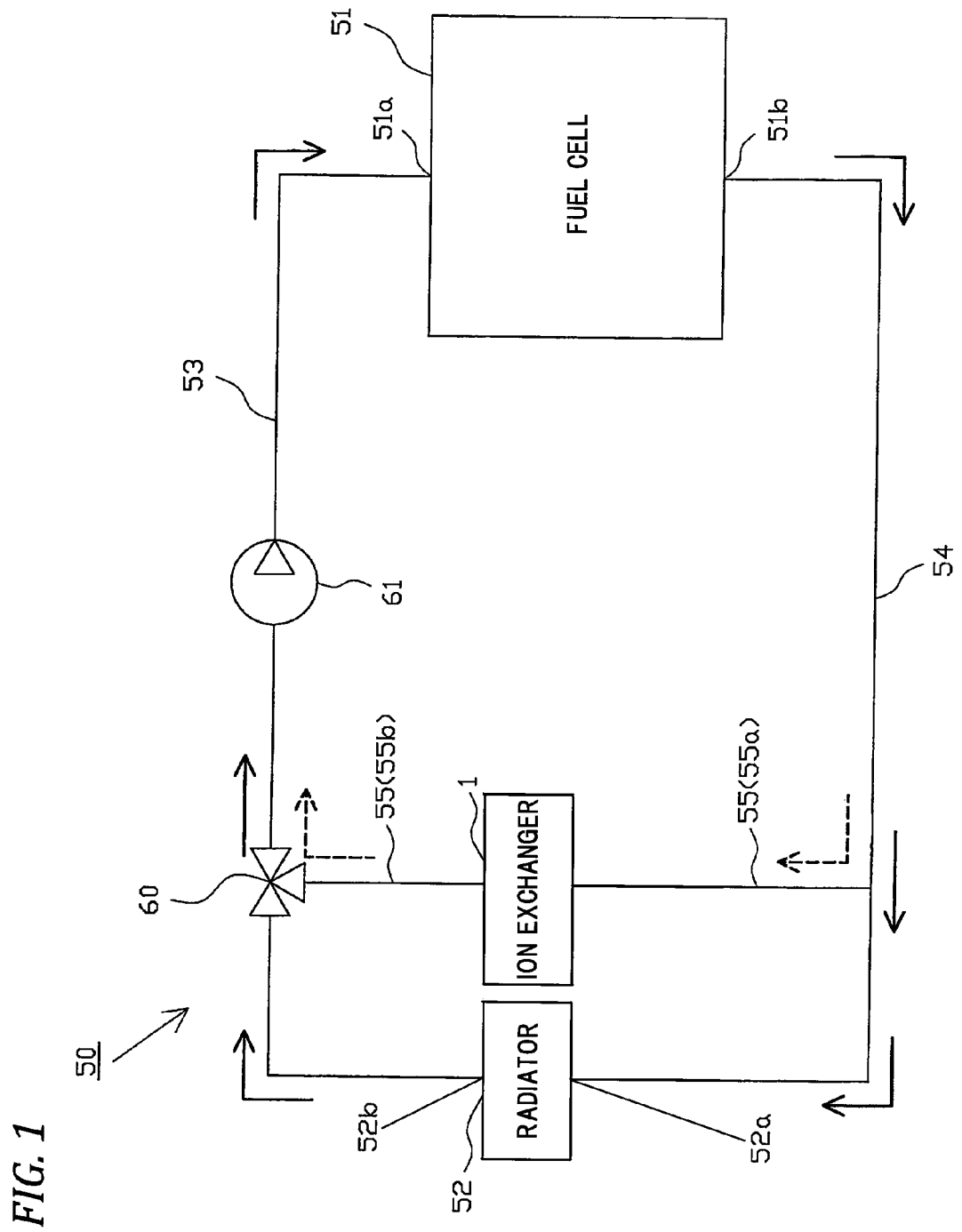
FIG. 1 is a schematic configuration view illustrating a cooling system of a fuel cell system.

Hereinafter, one embodiment of the invention will be described with reference to the drawings. An ion exchanger according to the invention is, for example, used in a cooling system of a fuel cell system in a fuel cell vehicle. FIG. 1 is a schematic configuration view illustrating a cooling system 50 of the fuel cell system to which an ion exchanger 1 which will be described later is attached.

As illustrated in FIG. 1, in the cooling system 50, the flow path in which the coolant 17 circulates is mainly configured of an upstream side pipe 53 which connects an inlet port 51*a* of a fuel cell 51 and an outlet port 52*b* of a radiator 52 to each other, a downstream side pipe 54 which connects an outlet port 51*b* of the fuel cell 51 and an inlet port 52*a* of the radiator 52 to each other, and a bypass pipe 55 connected to the radiator 52, the upstream side pipe 53, and the downstream side pipe 54 in parallel.

The ion exchanger 1 is installed in the bypass pipe 55, and a three-way valve (three-way electromagnetic valve) 60 is installed at a connection part between the bypass pipe 55 and the upstream side pipe 53. In addition, in the upstream side pipe 53 between the three-way valve 60 and the fuel cell 51, a pump 61 for circulating the coolant 17 is installed. Furthermore, various types of control related to the cooling system 50, such as a switching control of the three-way valve 60 and a driving control of the pump 61, are performed by a control unit which is not illustrated.

Here, first, a configuration of the fuel cell 51 will be described. A general fuel cell (single high polymer fuel cell) has a fuel cell stack in which a plurality of power generating cells are stacked. In the power generating cells, on both sides of an electrolyte film, a membrane electrode assembly (MEA) in which an anode (fuel electrode) and a cathode (air electrode) which are respectively configured of a catalytic layer and a gas dispersion layer are installed is nipped by one pair of separators.

Fuel gas (for example, hydrogen gas) is supplied to the anode of each of the power generating cells, and oxidizing gas (for example, air) is supplied to the cathode. As the fuel gas is supplied to the anode, hydrogen contained in the fuel gas reacts to a catalyst of the catalytic layer that configures the anode, and according to this, hydrogen ions are generated. The generated hydrogen ion passes through the electrolyte film, and a chemical reaction to oxygen is caused in the cathode. Power is generated by the chemical reaction.

Each of the power generating cells generates heat in accordance with the power generation. In the fuel cell 51 (fuel cell stack), a flow path (not illustrated) for circulating the coolant 17 with respect to each of the power generating cells is formed, and the power generating cells are cooled by the coolant 17 introduced to the inside from the inlet port 51*a*. In addition, the coolant 17 to which the heat exchange is finished is discharged from the outlet port 51*b*.

Furthermore, in the embodiment, long life coolant (LLC) obtained by containing an ethylene glycol (antifreezing fluid) in water, is used as coolant 17. Therefore, when the power generating cell of the fuel cell 51 is cooled by the coolant 17, the ethylene glycol contained in the coolant 17 is heated and decomposed, acid (for example, formic acid) is generated, and negative ions are generated by the acid. In addition, when the inner surface of a circulation flow path (pipes 53, 54, 55 and the like) of the coolant 17 is etched by the acid, positive ions are also generated. In this manner, the coolant 17 contains impurity ions in which the negative ions and the positive ions are mixed with each other. Since the ions have electric charges, as the concentration of the impurity ions contained in the coolant 17 increases, conductivity of the coolant 17 increases. As a result, there is a concern that electric leakage to the outside from the fuel cell 51 through the coolant 17 is caused.

Meanwhile, the radiator 52 sprays the air by a blower fan which is not illustrated, and cools the coolant 17 warmed by the fuel cell 51. The coolant 17 is heated when passing through the inside of the radiator 52, and is cooled. In the embodiment, the flow of the coolant 17 is controlled such that the temperature of the fuel cell 51 becomes the most appropriate temperature (for example, 65° C.).

The three-way valve 60 switches the flow path in which the coolant 17 flows. More specifically, in a case where the temperature of the fuel cell 51 is below the most appropriate temperature, a first inlet (radiator 52 side) of the three-way valve 60 is closed, and a second inlet (bypass pipe 55 side) and an outlet (pump 61 side) are open. Accordingly, the coolant 17 circulates between the fuel cell 51 and the bypass pipe 55 by the driving of the pump 61. Meanwhile, when the temperature of the fuel cell 51 exceeds the most appropriate temperature, the first inlet and the outlet of the three-way valve 60 is open, and the second inlet is closed. Accordingly, the coolant 17 circulates between the fuel cell 51 and the radiator 52 by the driving of the pump 61, and the fuel cell 51 is cooled.

Therefore, in a case where the temperature of the fuel cell 51 is below the most appropriate temperature, the entire amount of coolant 17 in the cooling system 50 always circulates through the bypass pipe 55. At this time, as the coolant 17 passes through the ion exchanger 1, the impurity ions contained in the coolant are partially removed. Accordingly, the increase in conductivity of the coolant 17 is suppressed.

Figure 2:
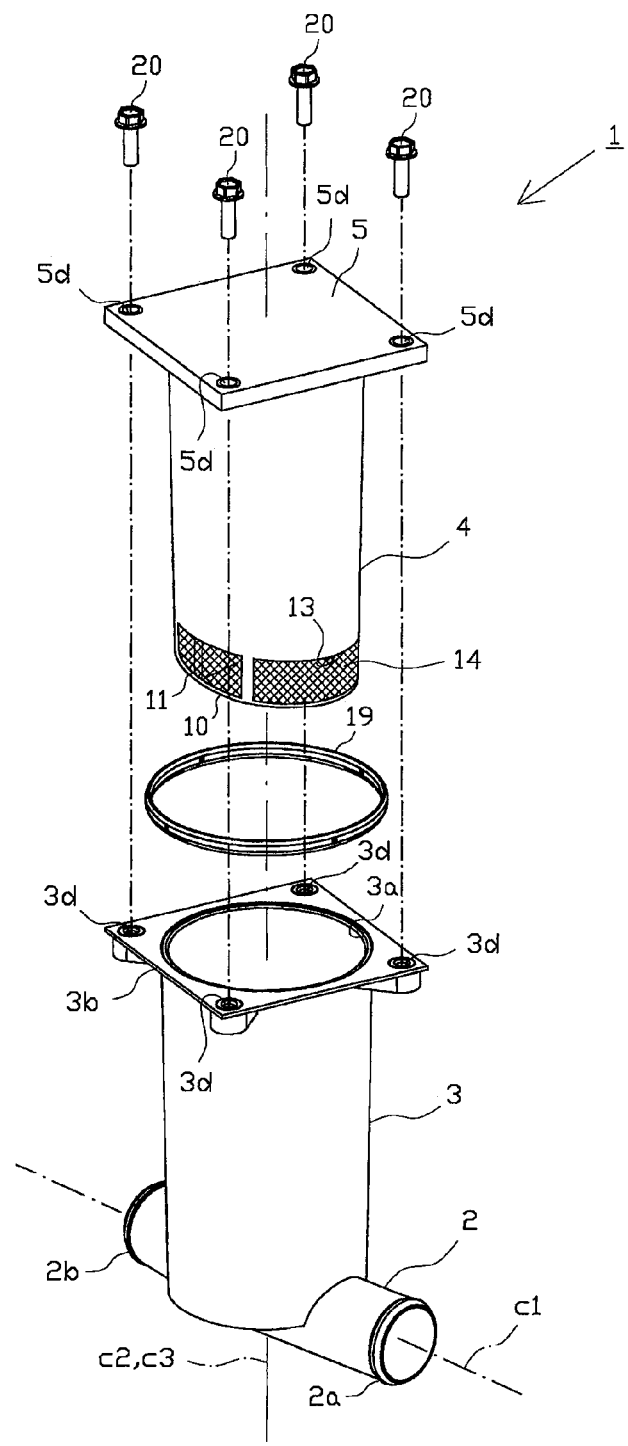
FIG. 2 is an exploded perspective view illustrating an ion exchanger.
Figure 3:
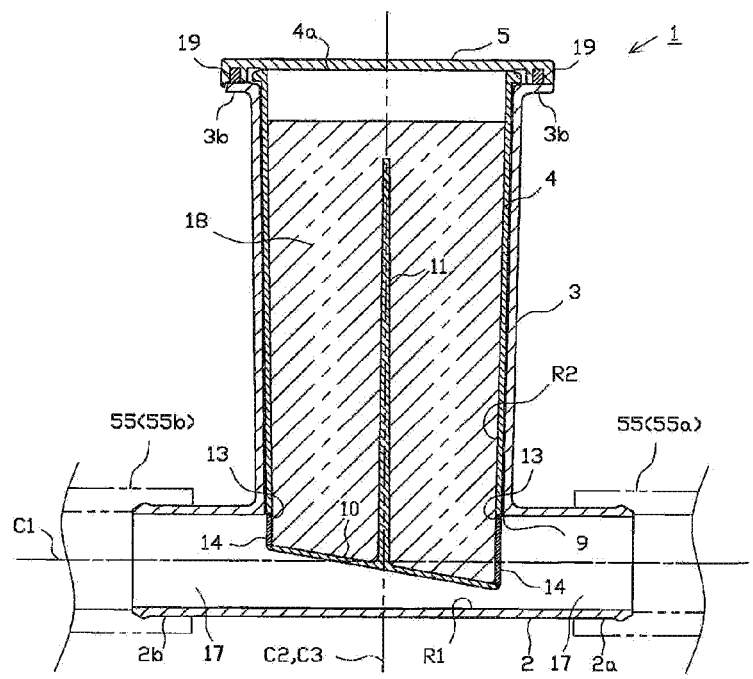
FIG. 3 is a sectional view illustrating the ion exchanger in a first assembled state under the situation where coolant does not flow.
Figure 4:
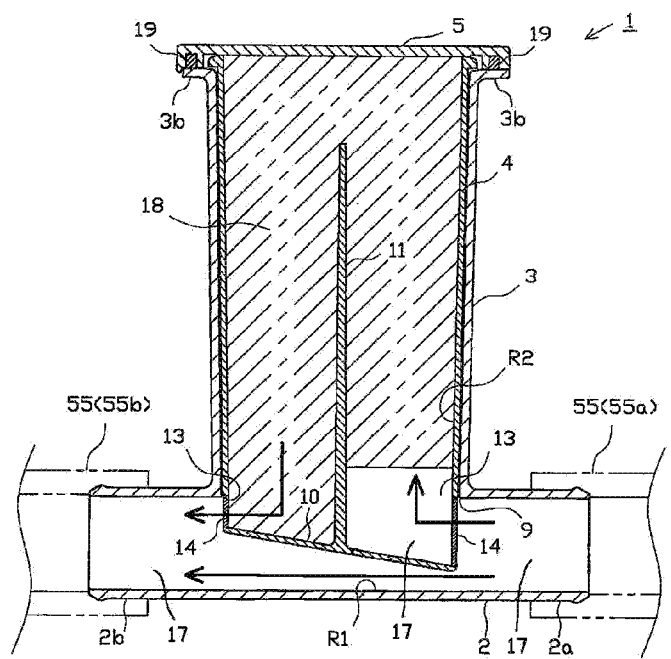
FIG. 4 is a sectional view illustrating the ion exchanger in the first assembled state under the situation where the coolant flows.
Figure 5:
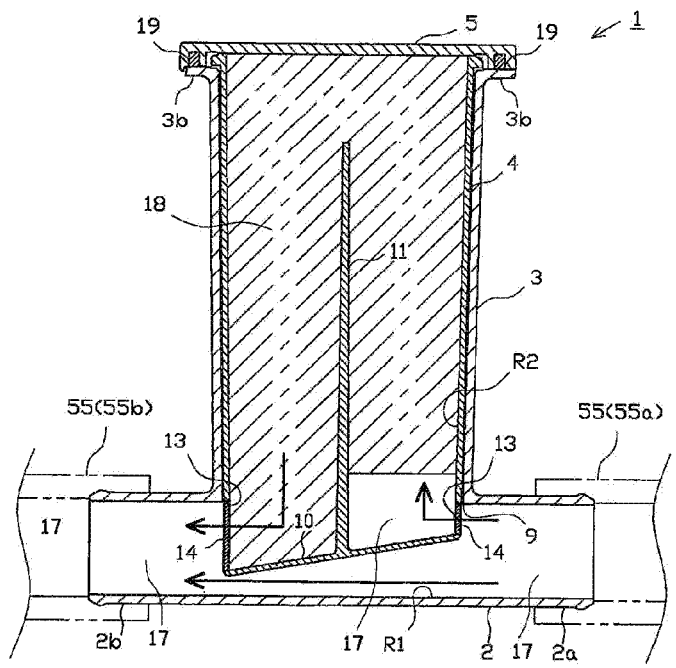
FIG. 5 is a sectional view illustrating the ion exchanger in a second assembled state under the situation where the coolant flows.

Hereinafter, a configuration of the ion exchanger 1 will be described with reference to FIGS. 2 to 5. FIG. 2 is an exploded perspective view illustrating the ion exchanger 1. FIG. 3 is a sectional view illustrating the ion exchanger in a first assembled state under the situation where the coolant 17 does not flow, FIG. 4 is a sectional view illustrating the ion exchanger in the first assembled state under the situation where the coolant 17 flows, and FIG. 5 is a sectional view illustrating the ion exchanger in a second assembled state under the situation where the coolant 17 flows.

The ion exchanger 1 has a configuration in which a communicating tube portion 2 connected to the bypass pipe 55, an outer cylinder portion 3 formed to be integrated with the communicating tube portion 2, an inner cylinder portion 4 stored on the inside of the outer cylinder portion 3, and a lid portion 5 which blocks the outer cylinder portion 3, are provided, and the assembled state of the inner cylinder portion 4 and the lid portion 5 with respect to outer cylinder portion 3 is changeable to the first assembled state and the second assembled state. Therefore, in the embodiment, the outer cylinder portion 3 corresponds to a case portion, and the inner cylinder portion 4 and the lid portion 5 configure the storage body.

The communicating tube portion 2 makes a substantially cylindrical shape formed in a shape of a straight line as the entire body. The communicating tube portion 2 is connected to the bypass pipe 55 such that a center axial line C1 thereof is along a substantially horizontal direction.

The communicating tube portion 2 includes an introduction side joint portion 2*a* which can be connected to a bypass pipe 55*a* on the upstream side in one end portion in the longitudinal direction, and includes a leading-out side joint portion 2*b* which can be connected to a bypass pipe 55*b* on the downstream side in the other end portion in the longitudinal direction. The opening portion of the introduction side joint portion 2*a* configures the inlet port of the communicating tube portion 2, and the opening portion of the leading-out side joint portion 2*b* configures the outlet port of the communicating tube portion 2.

The outer cylinder portion 3 is formed to protrude upward from the communicating tube portion 2, and makes a bottomed cylindrical shape of which the upper surface is open. However, the communicating tube portion 2 and the outer cylinder portion 3 communicate with each other on the inside via an opening portion 9.

In a state where the center axial line C1 of the communicating tube portion 2 and the a center axial line C2 of the outer cylinder portion 3 are orthogonal to each other, and the ion exchanger 1 is attached to the bypass pipe 55, a state is achieved where the center axial line C2 of the outer cylinder portion 3 is along a substantially vertical direction.

The inner cylinder portion 4 makes a bottomed cylindrical shape of which the upper surface is open as the entire body, and is stored in the outer cylinder portion 3 such that a center axial line C3 thereof overlaps the center axial line C2 of the outer cylinder portion 3. Therefore, the direction of the center axial line C2 of the outer cylinder portion 3 is an assembling direction of the inner cylinder portion 4 in the embodiment. The inner cylinder portion 4 stored in the outer cylinder portion 3 is in a state where a part (a bottom wall portion 10 and a circumferential wall portion in the vicinity thereof) on the tip end side in the assembling direction protrudes to the inside of the communicating tube portion 2 via the opening portion 9. Here, the bottom wall portion 10 configures the end surface (tip end surface in the assembling direction) on the communicating tube portion side in the embodiment.

In the inner cylinder portion 4, a partition wall portion 11 which divides the inside into two areas is formed. The partition wall portion 11 is formed along the plane including the center axial line C3. In addition, in a state where the inner cylinder portion 4 is stored in the outer cylinder portion 3, a state where the partition wall portion 11 is disposed along the plane orthogonal to the center axial line C1 of the communicating tube portion 2 is achieved. However, the upper end portion of the partition wall portion 11 is provided at a position lower than the upper end portion (upper opening edge portion 4a) of the inner cylinder portion 4, and the two areas communicate with each other in the upper portion of the inner cylinder portion 4. Meanwhile, the lower end portion of the partition wall portion 11 is connected to the bottom wall portion 10.

The bottom wall portion 10 of the inner cylinder portion 4 is formed to be inclined with respect to the partition wall portion 11 (center axial line C3 of the inner cylinder portion 4). In a state where the inner cylinder portion 4 is stored in the outer cylinder portion 3, the bottom wall portion 10 is disposed to be inclined with respect to the center axial line C1 of the communicating tube portion 2.

More specifically, in the first assembled state illustrated in FIGS. 3 and 4, the inner cylinder portion 4 is stored such that the lowest part of the bottom wall portion 10 is positioned on the most upstream side and the highest part is positioned on the most downstream side. In other words, a state where the protrusion amount of the inner cylinder portion 4 to the communicating tube portion 2 is the largest on the most upstream side and is the smallest on the most downstream side, is achieved.

Meanwhile, in the second assembled state illustrated in FIG. 5, the inner cylinder portion 4 is stored such that the lowest part of the bottom wall portion 10 is positioned on the most downstream side and the highest part is positioned on the most upstream side. In other words, a state is achieved where the protrusion amount of the inner cylinder portion 4 to the communicating tube portion 2 is the largest on the most downstream side and is the smallest on the most upstream side.

An opening portion 13 is formed in the circumferential wall portion of the inner cylinder portion 4 that protrudes to the inside of the communicating tube portion 2. Accordingly, a state is achieved where the communicating tube portion 2 and the inner cylinder portion 4 communicate with each other. A network-like mesh 14 is attached to the opening portion 13. While allowing the passage of the coolant 17, the mesh 14 interferes with the passage of an ion exchange resin 18 which will be described later.

In the opening portion 13 in the embodiment, an upper edge portion thereof is formed along the same height position (the same position in the axial line C3 direction) and a lower edge portion thereof is formed along the bottom wall portion 10. In other words, a vertical width of the opening portion 13 varies according to the circumferential direction of the inner cylinder portion 4. Specifically, the vertical width of the opening portion 13 at the position that corresponds to the lowest part of the bottom wall portion 10 is the largest, and the vertical width of the opening portion 13 at the position that corresponds to the highest part of the bottom wall portion 10 is the smallest (refer to FIG. 3 or the like). Accordingly, an opening area of the opening portion 13 varies in each predetermined range in the circumferential direction of the inner cylinder portion 4.

Under the above-described configuration, between the bottom wall portion 10 of the inner cylinder portion 4 and the inner wall portion of the communicating tube portion 2, a first flow path R1 through which the coolant 17 introduced from the inlet port of the communicating tube portion 2 passes to the outlet port of the communicating tube portion 2 is formed. However, in the first flow path R1 in the first assembled state (refer to FIGS. 3 and 4), the inlet port is narrower than the outlet port by the inclination of the bottom wall portion 10 of the inner cylinder portion 4. Meanwhile, in the first flow path R1 in the second assembled state (refer to FIG. 5), the inlet port is wider than the outlet port by the inclination of the bottom wall portion 10 of the inner cylinder portion 4.

In addition, on the inside of the inner cylinder portion 4, a second flow path R2 into which a part of the coolant 17 is introduced via the opening portion 13 from the communicating tube portion 2, and which is curved in a substantial U shape as the entire body that returns to the communicating tube portion 2 again via the opening portion 13, is formed. Here, the inlet port of the second flow path R2 is configured by the opening portion 13 positioned further on the upstream side than the partition wall portion 11 of the inner cylinder portion 4, and the outlet port of the second flow path R2 is configured by the opening portion 13 positioned further on the downstream side than the partition wall portion 11.

However, in the first assembled state (refer to FIGS. 3 and 4), the opening area (vertical width) of the inlet port of the second flow path R2 becomes greater than the opening area of the outlet port. Furthermore, the opening area of the inlet port of the second flow path R2 becomes greater than the opening area of the inlet port of the first flow path R1.

Meanwhile, in the second assembled state (refer to FIG. 5), the opening area of the inlet port of the second flow path R2 is smaller than the opening area of the outlet port. Furthermore, the opening area of the inlet port of the second flow path R2 is smaller than the opening area of the inlet port of the first flow path R1.

In the inner cylinder portion 4 (second flow path R2), the granular ion exchange resin 18 which can remove the impurity ions contained in the coolant 17 by the ion exchange is stored. The ion exchange resin 18 is a known resin, and in the embodiment, an anion exchange resin which adsorbs the negative ions and a cation exchange resin which adsorbs the positive resin are stored to be mixed with each other.

The upper opening edge portion 4a of the inner cylinder portion 4 is fixed to the inner surface (rear surface) of the lid portion 5 by a predetermined adhering means. Accordingly, the inner cylinder portion 4 and the lid portion 5 are integrated with each other, and the ion exchange resin 18 can be handled as one cartridge of which the inside is sealed. In addition, a part of the second flow path R2 is configured by the inner surface of the lid portion 5.

Meanwhile, the lid portion 5 is fixed to the outer cylinder portion 3 to be attachable and detachable. In the embodiment, the lid portion 5 is fastened by four bolts 20 via a packing 19 with respect to a flange portion 3b formed at the circumferential edge of an upper opening portion 3a of the outer cylinder portion 3.

More specifically, as illustrated in FIG. 2, in the flange portion 3b of the outer cylinder portion 3, four screw holes 3d are formed at an equivalent interval (interval of 90°) around the center axial line C2. Meanwhile, four screw holes 5d are formed in the lid portion 5. In addition, by fixing the bolt 20 to each of the screw holes 3d and 5d in a state where each of the screw holes 3d of the outer cylinder portion 3 and each of the screw holes 5d of the lid portion 5 are positioned, the positions of the inner cylinder portion 4 and the lid portion 5 are fixed to each other. A positioning unit in the embodiment is configured of the screw holes 3d and 5d and the bolt 20.

By the configuration, by shifting the positional relationship of each of the screw holes 3d of the outer cylinder portion 3 and each of the screw holes 5d of the lid portion 5 one by one, the assembled state of the inner cylinder portion 4 with respect to the outer cylinder portion 3 can be changed with an interval of 90° C. regarding the center axial line C2 (center axial line C3 of the inner cylinder portion 4) of the outer cylinder portion 3 as an axial center.

In the embodiment, regarding the center axial line C3 of the inner cylinder portion 4 as an axial center, by rotating the inner cylinder portion 4 by 180°, the assembled state of the inner cylinder portion 4 with respect to the outer cylinder portion 3 can be changed to the first assembled state (refer to FIGS. 3 and 4) and the second assembled state (refer to FIG. 5). In other words, the position of the opening portion 13 which serves as the inlet port of the second flow path R2 and the position of the opening portion 13 which serves as the outlet port can be changed to each other.

Next, effects of the ion exchanger 1 of the embodiment configured as described above will be described. A part of the coolant 17 introduced to the communicating tube portion 2 via the bypass pipe 55a on the upstream side is introduced to the second flow path R2 via the opening portion 13 on the upstream side. The remaining coolant 17 is introduced to the outlet port of the communicating tube portion 2 via the first flow path R1, and is discharged to the bypass pipe 55b on the downstream side.

Furthermore, as illustrated in FIGS. 4 and 5, in the embodiment, a configuration is employed in which, when circulating the coolant 17, the ion exchange resin 18 in the inner cylinder portion 4 is swept away to the downstream side, and an inlet space portion in which the ion exchange resin 18 does not exist is formed in the vicinity of the inlet port (opening portion 13 on the upstream side) of the second flow path R2. Therefore, the coolant 17 which has passed through the inlet port (opening portion 13 on the upstream side) of the second flow path R2 first enters the inlet space portion.

After this, the coolant 17 flows upward along the second flow path R2 through a void of the ion exchange resin 18, U-turns in the upper end portion of the partition wall portion 11, and flows downward to the outlet port (opening portion 13 on the downstream side) of the second flow path R2. During the movement, the impurity ions contained in the coolant 17 are removed by the ion exchange resin 18.

In addition, the coolant 17 is discharged to the communicating tube portion 2 from the outlet port of the second flow path R2. In this manner, the coolant 17 discharged to the communicating tube portion 2 is merged with the coolant 17 of the first flow path R1, is introduced to the outlet port of the communicating tube portion 2, and is discharged to the bypass pipe 55b on the downstream side.

By the configuration, in the embodiment, it is possible to increase a proportion of the coolant 17 that flows to the second flow path R2 by setting the assembled state of the inner cylinder portion 4 with respect to the outer cylinder portion 3 to the first assembled state (refer to FIGS. 3 and 4), and to reduce the proportion of the coolant 17 that flows to the second flow path R2 by setting the assembled state to the second assembled state (refer to FIG. 5). In other words, by changing the assembled state of the inner cylinder portion 4, it is possible to change the performance of the ion exchanger 1 into a state where the ion exchange efficiency and the pressure loss are high and a state where the ion exchange efficiency and the pressure loss are low.

In addition, in the embodiment, in an initial operation stage of the fuel cell system in which an ion elution amount increases in the cooling system 50, the ion exchange efficiency increases by setting the assembled state of the inner cylinder portion 4 to the first assembled state. Meanwhile, after a predetermined period during which the ion elution amount decreases has elapsed, by changing the assembled state of the inner cylinder portion 4 into the second assembled state, for example, at the time of factory shipment or one-month inspection, a state where the pressure loss is low is achieved.

As described above in detail, according to the embodiment, by providing the communicating tube portion 2 (first flow path R1) having a shape of a substantially straight line, it is possible to allow a part of the coolant 17 introduced to the ion exchanger 1 to pass straight forward without passing through the inner cylinder portion 4 (ion exchange resin 18), and to lead out the coolant 17 from the ion exchanger 1 with the shortest distance. As a result, it is possible to extremely reduce the pressure loss Furthermore, the configuration is employed in the embodiment in which the proportion of the coolant 17 that flows to the second flow path R2 can be changed by changing the assembled state of the inner cylinder portion 4 with respect to the outer cylinder portion 3. Accordingly, it is possible to change the performance (ion exchange efficiency or proportion of the pressure loss) of the ion exchanger 1 in accordance with the request that varies according to the operation time of the fuel cell system.

In particular, in the embodiment, since it is not necessary to provide a plurality of flow paths (second flow path R2) which store the ion exchange resin 18 therein, and it is also not necessary to provide a mechanism or the like for switching the plurality of flow paths, it is possible to reduce the size of the ion exchanger 1, and to simplify the structure. Furthermore, since it is also not necessary to exchange the inner cylinder portion 4 (cartridge) to an additional product for changing the above-described performance, it is possible to suppress an increase in number of components, and to save the energy.

Second Embodiment

Figure 6:
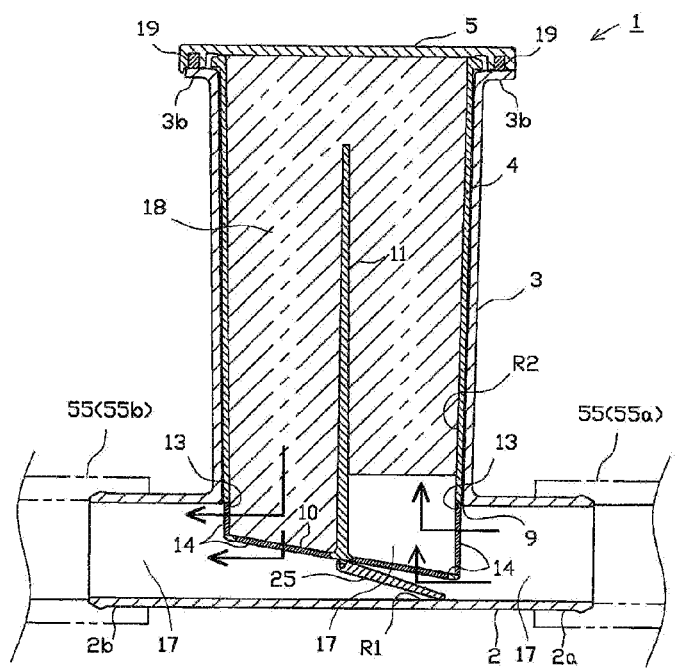
FIG. 6 is a sectional view illustrating an ion exchanger in a first assembled state according to a second embodiment.
Figure 7:
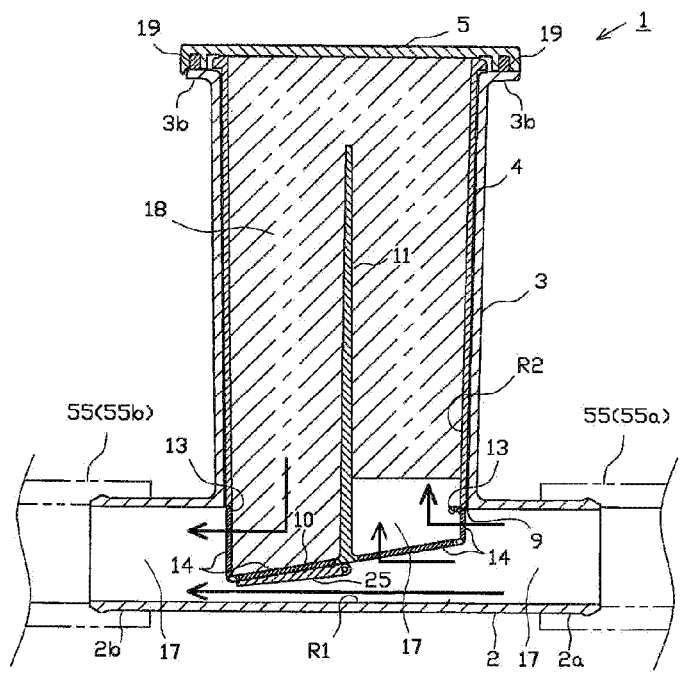
FIG. 7 is a sectional view illustrating the ion exchanger in a second assembled state according to the second embodiment.

Next, a second embodiment will be described in detail with reference to FIGS. 6 and 7. FIG. 6 is a sectional view illustrating the ion exchanger in the first assembled state according to the embodiment, and FIG. 7 is a sectional view illustrating the ion exchanger in the second assembled state. However, the parts that overlap those in the above-described first embodiment will be given the same reference names and the same reference numbers, the detailed description thereof will be omitted, and the description will focus on parts different from those of the first embodiment hereinafter.

In the embodiment, in addition to the circumferential wall portion of the inner cylinder portion 4, the opening portion 13 is also formed in the bottom wall portion 10, and the mesh 14 is attached thereto. In addition, in the first assembled state (refer to FIG. 6), the inner cylinder portion 4 is stored such that the lowest part of the bottom wall portion 10 is positioned on the most upstream side and the highest part is positioned on the most downstream side. Meanwhile, in the second assembled state (refer to FIG. 7), the inner cylinder portion 4 is stored such that the lowest part of the bottom wall portion 10 is positioned on the most downstream side and the highest part is positioned on the most upstream side.

Furthermore, in the embodiment, a clamp 25 of which one end is supported to be rotatable in the bottom wall portion 10 and the other end is a free end, and which serves as a movable piece disposed in the communicating tube portion 2, is provided. The rotation axis direction of the clamp 25 is set along the partition wall portion 11.

In the first assembled state (refer to FIG. 6), a state is achieved where the free end side of the clamp 25 is positioned further on the upstream side of the first flow path R1 than the rotation axis side. Accordingly, when the coolant 17 is introduced to the communicating tube portion 2 via the bypass pipe 55a on the upstream side, the clamp 25 is displaced to block the first flow path R1, and the entire amount or an extremely large amount of coolant 17 is introduced to the second flow path R2 via the opening portion 13 on the upstream side. After this, the coolant 17 discharged to the communicating tube portion 2 from the outlet port of the second flow path R2 is introduced to the outlet port of the communicating tube portion 2, and is discharged to the bypass pipe 55b on the downstream side.

Meanwhile, in the second assembled state (refer to FIG. 7), a state is achieved where the free end side of the clamp 25 is positioned further on the downstream side of the first flow path R1 than the rotation axis side. Accordingly, when the coolant 17 is introduced to the communicating tube portion 2 via the bypass pipe 55a on the upstream side, a state where the clamp 25 is displaced to open the first flow path R1 and the opening portion 13 on the downstream side formed in the bottom wall portion 10 is blocked, is achieved. In addition, a part of the coolant 17 introduced to the communicating tube portion 2 via the bypass pipe 55a on the upstream side is introduced to the second flow path R2 via the opening portion 13 on the upstream side. The remaining coolant 17 is introduced to the outlet port of the communicating tube portion 2 via the first flow path R1 and is discharged to the bypass pipe 55b on the downstream side.

As described in detail above, according to the embodiment, operational effects similar to those of the above-described first embodiment are achieved. In particular, according to the embodiment, by the operational effect of the clamp 25, in the first assembled state, it is possible to introduce a larger amount of coolant 17 to the second flow path R2. As a result, it is possible to improve the ion exchange efficiency.

Third Embodiment

Figure 8:
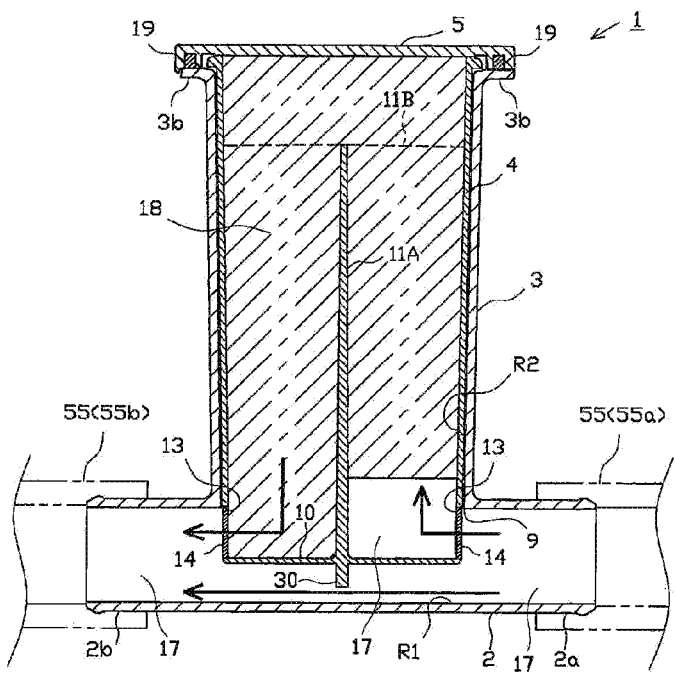
FIG. 8 is a sectional view illustrating an ion exchanger in a first assembled state according to a third embodiment.
Figure 9:
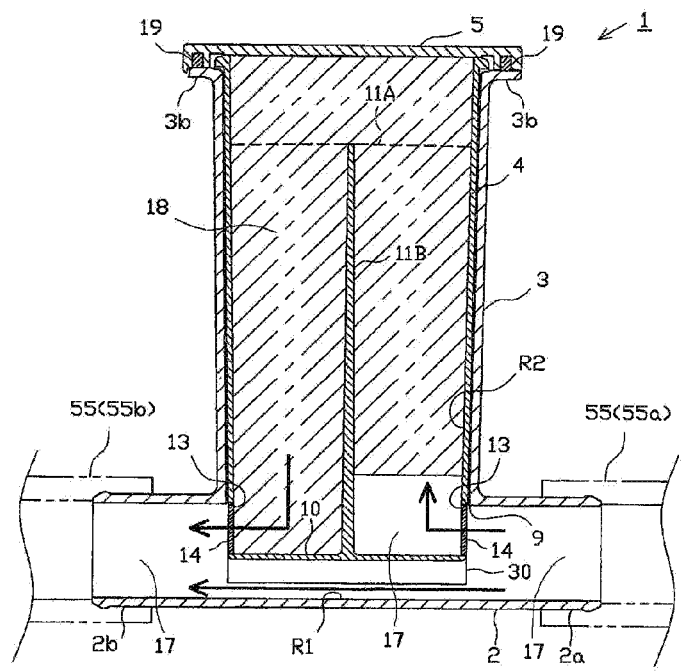
FIG. 9 is a sectional view illustrating the ion exchanger in a second assembled state according to the third embodiment.

Next, a third embodiment will be described in detail with reference to FIGS. 8 and 9. FIG. 8 is a sectional view illustrating the ion exchanger in the first assembled state according to the embodiment, and FIG. 9 is a sectional view illustrating the ion exchanger in the second assembled state. However, the parts that overlap those in the above-described first embodiment will be given the same reference names and the same reference numbers, the detailed description thereof will be omitted, and the description will focus on parts different from those of the first embodiment hereinafter.

In the inner cylinder portion 4, two partition wall portions 11A and 11B are formed to divide the inside into four areas. The partition wall portions 11A and 11B are formed to intersect with each other in a cross-sectional shape in the center axial line C3. In addition, in the first assembled state (refer to FIG. 8), a state is achieved where the partition wall portion 11A is disposed along the plane orthogonal to the center axial line C1 of the communicating tube portion 2. Meanwhile, in the second assembled state (refer to FIG. 9), a state is achieved where the partition wall portion 11B is disposed along the plane orthogonal to the center axial line C1 of the communicating tube portion 2.

However, the upper end portion of the partition wall portions 11A and 11B is provided at a position lower than the upper end portion (upper opening edge portion 4a) of the inner cylinder portion 4, and four areas communicate with each other in the upper portion of the inner cylinder portion 4. Meanwhile, the lower end portion of the partition wall portions 11A and 11B are connected to the bottom wall portion 10.

In addition, in the embodiment, the bottom wall portion 10 of the inner cylinder portion 4 is formed to be orthogonal to the partition wall portions 11A and 11B (center axial line C3 of the inner cylinder portion 4). In addition, the vertical width of the opening portion 13 formed in the circumferential wall portion of the inner cylinder portion 4 is constant in the circumferential direction of the inner cylinder portion 4.

Accordingly, in the embodiment, the opening areas (vertical width) of the inlet port and the outlet port of the first flow path R1 are constant in the first assembled state (refer to FIG. 8) and in the second assembled state (refer to FIG. 9). Similarly, the opening areas of the inlet port and the outlet port of the second flow path R2 are constant in the first assembled state and in the second assembled state.

Furthermore, in the embodiment, a rib 30 having a shape of a substantially flat plate which serves as a protrusion piece is formed to protrude from the bottom wall portion 10. The rib 30 is formed along the partition wall portion 11A.

Under the above-described configuration, in the embodiment, by rotating the inner cylinder portion 4 by 90° regarding the center axial line C3 of the inner cylinder portion 4 as the axial center, it is possible to change the assembled state of the inner cylinder portion 4 with respect to the outer cylinder portion 3 into the first assembled state (refer to FIG. 8) and the second assembled state (refer to FIG. 9).

In addition, a part of the coolant 17 introduced to the communicating tube portion 2 via the bypass pipe 55a on the upstream side is introduced to the second flow path R2 via the opening portion 13 on the upstream side. The remaining coolant 17 is introduced to the outlet port of the communicating tube portion 2 via the first flow path R1, and is discharged to the bypass pipe 55b on the downstream side.

The coolant 17 introduced to the second flow path R2 passes through the void of the ion exchange resin 18, and flows upward along the second flow path R2. After this, the coolant 17 U-turns in the upper end portion of the partition wall portion 11A or the partition wall portion 11B, and flows downward toward the outlet port (opening portion 13 on the downstream side) of the second flow path R2. In addition, the coolant 17 is discharged to the communicating tube portion 2 from the outlet port of the second flow path R2, is merged with the coolant 17 of the first flow path R1, is introduced to the outlet port of the communicating tube portion 2, and is discharged to the bypass pipe 55b on the downstream side.

At this time, in the first assembled state, a state is achieved where the rib 30 is installed along the direction orthogonal to the flow path direction (center axial line C1) of the first flow path R1. Accordingly, when the coolant 17 is introduced to the communicating tube portion 2 via the bypass pipe 55a on the upstream side, a state is achieved where the rib 30 imparts a larger resistance to the coolant 17 that flows in the first flow path R1, the proportion of the coolant 17 that flows to the first flow path R1 decreases, and as much as the decreasing amount, the proportion of the coolant 17 that flows to the second flow path R2 increases.

Meanwhile, in the second assembled state (refer to FIG. 9), a state is achieved where the rib 30 is installed along the flow path direction (center axial line C1) of the first flow path R1. Accordingly, when the coolant 17 is introduced to the communicating tube portion 2 via the bypass pipe 55a on the upstream side, a state is achieved where the resistance imparted by the rib 30 to the coolant 17 that flows in the first flow path R1 is smaller, the proportion of the coolant 17 that flows to the first flow path R1 increases, and as much as the increasing amount, the proportion of the coolant 17 that flows to the second flow path R2 decreases.

As described in detail above, according to the embodiment, operational effects similar to those of the above-described first embodiment are achieved. In particular, according to the embodiment, it is possible to change the proportion of the coolant 17 that flows to the second flow path R2.

Fourth Embodiment

Figure 10:
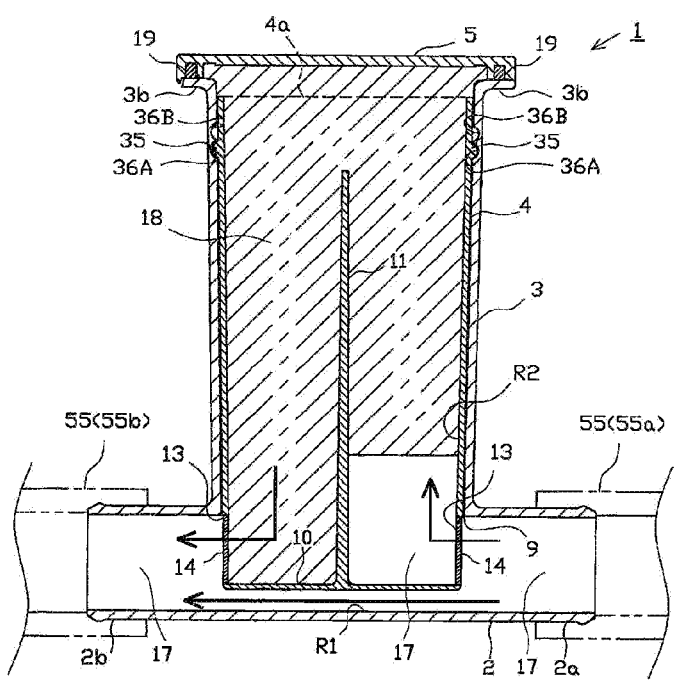
FIG. 10 is a sectional view illustrating an ion exchanger in a first assembled state according to a fourth embodiment.
Figure 11:
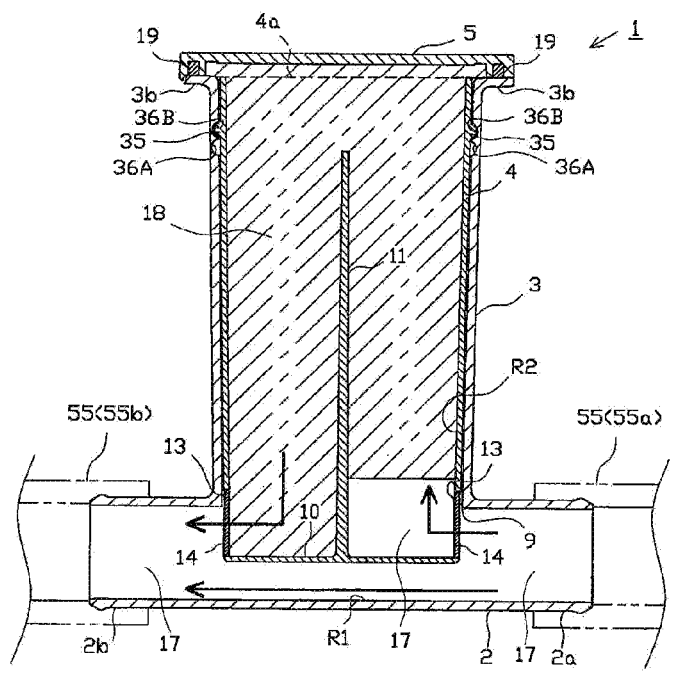
FIG. 11 is a sectional view illustrating the ion exchanger in a second assembled state according to the fourth embodiment.

Next, a fourth embodiment will be described in detail with reference to FIGS. 10 and 11. FIG. 10 is a sectional view illustrating the ion exchanger in the first assembled state according to the embodiment, and FIG. 11 is a sectional view illustrating the ion exchanger in the second assembled state. However, the parts that overlap those in the above-described first embodiment will be given the same reference names and the same reference numbers, the detailed description thereof will be omitted, and the description will focus on parts different from those of the first embodiment hereinafter.

In the embodiment, the bottom wall portion 10 of the inner cylinder portion 4 is formed to be orthogonal to the partition wall portion 11 (center axial line C3 of the inner cylinder portion 4). In addition, the vertical width of the opening portion 13 formed in the circumferential wall portion of the inner cylinder portion 4 is constant in the circumferential direction of the inner cylinder portion 4. Accordingly, in the embodiment, the opening areas (vertical width) of the inlet port and the outlet port of the first flow path R1 are constant, and the opening areas of the inlet port and the outlet port of the second flow path R2 are constant.

In addition, in the embodiment, a configuration is employed in which the upper opening edge portion 4a of the inner cylinder portion 4 does not adhere to and is not fixed to the inner surface (rear surface) of the lid portion 5, and the inner cylinder portion 4 and the lid portion 5 are handled as separated bodies. Additionally, a configuration is employed in which the assembled state of the inner cylinder portion 4 with respect to the outer cylinder portion 3 is aligned in the vertical direction (center axial line C2 direction). In the embodiment, the inner cylinder portion 4 configures the storage body.

Accordingly, the height position of the bottom wall portion 10 of the inner cylinder portion 4, that is, the protrusion amount of the inner cylinder portion 4 to the communicating tube portion 2 is changed in the first assembled state (refer to FIG. 10) and in the second assembled state (refer to FIG. 11). In other words, the opening area of the inlet port and the outlet port of the first flow path R1 and the opening area of the inlet port and the outlet port of the second flow path R2 are changed in the first assembled state and in the second assembled state.

Here, the opening areas (vertical width) of the inlet port and the outlet port of the second flow path R2 which are open in the communicating tube portion 2 in the first assembled state are greater than those in the second assembled state. On the contrary, the opening areas of the inlet port and the outlet port of the first flow path R1 in the first assembled state are smaller than those in the second assembled state.

More specifically, on the outer circumferential surface of the inner cylinder portion 4, an engaging projected portion 35 having a substantially sectional semicircular shape, is formed along the circumferential direction. Corresponding to this, on the inner circumferential surface of the outer cylinder portion 3, a first engaging recessed portion 36A having a substantially sectional semicircular shape with which the engaging projected portion 35 can be engaged is formed along the circumferential direction, and a second engaging recessed portion 36B having a substantially sectional semicircular shape with which the engaging projected portion 35 can be engaged is formed along the circumferential direction with a predetermined interval above the first engaging recessed portion 36A.

In addition, in a case where the inner cylinder portion 4 is in the first assembled state (refer to FIG. 10), the engaging projected portion 35 is engaged with the first engaging recessed portion 36A, and in a case where the inner cylinder portion 4 is in the second assembled state (refer to FIG. 11), the engaging projected portion 35 is engaged with the second engaging recessed portion 36B. Accordingly, it is possible to position the inner cylinder portion 4 in each of the assembled states. Therefore, the positioning unit in the embodiment is configured of the engaging projected portion 35, and the first engaging recessed portion 36A and the second engaging recessed portion 36B.

Under the above-described configuration, when changing the assembled state of the inner cylinder portion 4 from the first assembled state to the second assembled state, for example, at the time of factory shipment or one-month inspection, after taking out the lid portion 5 in a state where the coolant 17 does not flow, the inner cylinder portion 4 which is in the first assembled state is pulled upward in a direction reverse to the assembling direction.

When pulling the inner cylinder portion 4, while the inner cylinder portion 4 is elastically deformed, the engaging projected portion 35 is removed from the first engaging recessed portion 36A, and the inner cylinder portion 4 is displaced upward. After this, when the engaging projected portion 35 reaches the second engaging recessed portion 36B, the engaging projected portion 35 is engaged with the second engaging recessed portion 36B, and the inner cylinder portion 4 returns to the initial state. Accordingly, a state is achieved where the inner cylinder portion 4 is positioned in the second assembled state.

As described in detail above, according to the embodiment, operational effects similar to those of the above-described first embodiment are achieved.

Furthermore, not being limited to the described contents of the above-described embodiments, for example, the invention may be realized as follows. It is needless to say that other application examples and modification examples which are not described hereinafter are also possible.

In each of the above-described embodiments, the invention is embodied as the ion exchanger used in the cooling system of the fuel cell system in the fuel cell vehicle, but not being limited thereto, the invention may be embodied, for example, as an ion exchanger which is used in a cooling system of a fuel cell system for power generation in a factory or at home.

The configuration, such as the attaching position of the ion exchanger 1, in the cooling system 50 is not limited to each of the above-described embodiments. For example, a configuration may be employed in which the ion exchanger 1 is attached to the cooling system that can control a flow rate of the coolant 17 to the radiator 52 or the bypass pipe 55. In addition, a configuration may be employed in which a second bypass pipe which branches from the bypass pipe 55 is provided, and the ion exchanger 1 is attached to the second bypass pipe.

In each of the above-described embodiments, the substantially cylindrical communicating tube portion 2 formed in a shape of a straight line is employed, but the configuration of the communicating tube portion is not limited thereto. For example, a configuration may be employed in which the communicating tube portion 2 is curved in a U shape or in an L shape. However, it is more preferable to employ the communicating tube portion having a shape that is smoothly curved or bent to the extent that at least the coolant 17 can smoothly flow.

In each of the above-described embodiments, a configuration is employed in which the assembled state of the inner cylinder portion 4 with respect to the outer cylinder portion 3 is changed to two kinds, such as the first assembled state and the second assembled state, and the performance of the ion exchanger 1 is changed into two kinds. Not being limited thereto, a configuration may be employed in which the assembled state of the inner cylinder portion 4 with respect to the outer cylinder portion 3 is changed into three or more kinds, and the performance of the ion exchanger 1 is changed into three or more kinds. For example, under the configuration according to the fourth embodiment, a configuration may be employed in which a third engaging recessed portion with which the engaging projected portion 35 can be engaged is provided in addition to the first engaging recessed portion 36A and the second engaging recessed portion 36B, and the performance of the ion exchanger 1 can be changed into three steps.

In each of the above-described embodiments, a configuration is employed in which a part of the inner cylinder portion 4 is assembled to the outer cylinder portion 3 to protrude to the inside of the communicating tube portion 2, and the inlet port and the outlet port of the inner cylinder portion 4 are disposed to be open in the communicating tube portion 2, but not being limited thereto, other configurations may be employed.

For example, a configuration may be provided with: the storage body (cartridge) having a shape of a straight line which stores the ion exchange resin therein is provided, the opening portion which serves as the inlet port is provided on one end side of the storage body, the opening portion which serves as the outlet port is provided on the other end side; and the case portion including the inlet flow path through which the coolant 17 is introduced to the inlet port of the storage body from the communicating tube portion, and the outlet flow path through which the coolant 17 is led out to the communicating tube portion from the outlet port of the storage body, and the opening areas of both end portions of the storage body are formed to vary in advance. According to the configuration, by changing the assembled state (orientation) of the storage body with respect to the case portion, and by switching the position of the opening portion which serves as the inlet port in the storage body and the position of the opening portion which serves as the outlet port to each other, it is possible to change the proportion of the coolant 17 that flows to the storage body (second flow path).

(f) A configuration of the outer cylinder portion 3, the inner cylinder portion 4, and the lid portion 5 is not limited to each of the above-described embodiments, and other configurations may be employed.

For example, in each of the above-described embodiments, the outer cylinder portion 3 and the inner cylinder portion 4 are formed in a cylindrical shape, but not being limited thereto, a different shape may be employed such as an elliptical shape or a quadrangular cylinder shape. Furthermore, by configuring the outer cylinder portion 3 and the inner cylinder portion 4 in a polygonal cylinder shape, functions of the positioning unit for preventing the positional shift in the circumferential direction of the inner cylinder portion 4 is achieved.

In addition, in the above-described first to third embodiments, a configuration is employed in which the inner cylinder portion 4 is fixed to the inner surface of the lid portion 5 by predetermined adhering means, the inner cylinder portion 4 and the lid portion 5 are integrated with each other, and the ion exchange resin 18 can be handled as one cartridge of which the inside is sealed.

Not being limited thereto, for example, a configuration may be employed in which the inner cylinder portion 4 and the lid portion 5 are freely attachable and detachable. In the above-described first to third embodiments, similar to the fourth embodiment, a configuration may be employed in which the inner cylinder portion 4 and the lid portion 5 are not assembled and are respectively handled separately.

In addition, the assembly configuration of the lid portion 5 and the outer cylinder portion 3 is also not limited to that of each of the above-described embodiments, and other configurations may be employed. For example, in a case of a configuration in which the inner cylinder portion 4 and the lid portion 5 are not assembled to each other and are respectively handled separately, a configuration may be employed in which a male screw portion is formed in the outer circumferential portion of the outer cylinder portion 3, a female screw portion is formed on the inner side of the lid portion 5, and both of the screw portions are screwed to each other.

(g) The configuration according to the positioning unit is not limited to each of the above-described embodiments, and other configurations may be employed.

For example, in the above-described first to third embodiments, the positioning unit is configured of the screw holes 3d and 5d and the bolt 20, but instead of this, under the configuration in which the inner cylinder portion 4 and the lid portion 5 are not assembled to each other and are respectively handled separately, a configuration may be provided with a recessed portion or a projected portion which is provided on the inner circumferential surface of the outer cylinder portion 3 corresponding to each of the first assembled state and the second assembled state and an engaging projected portion or an engaging recessed portion which is provided on the outer circumferential surface of the inner cylinder portion 4 corresponding to the recessed portion or the projected portion and engaged with the recessed portion or the projected portion, and thus the positional shift in the circumferential direction of the inner cylinder portion 4 is prevented. In the above-described fourth embodiment, it is also needless to say that a configuration in which the positional shift in the circumferential direction of the inner cylinder portion 4 is prevented may be employed in addition to the configuration in which the positional shift in the vertical direction of the inner cylinder portion 4 is prevented.

(h) In the above-described first embodiment, a configuration is employed in which the bottom wall portion 10 of the inner cylinder portion 4 is formed to be inclined with respect to the center axial line C3, and according to this, the opening area of the opening portion 13 varies in each predetermined range in the circumferential direction of the inner cylinder portion 4. Not being limited thereto, under the configuration in which the bottom wall portion 10 of the inner cylinder portion 4 is formed to be orthogonal to the center axial line C3, a configuration may be employed in which the opening area of the opening portion 13 which serves as the inlet port and the opening area of the opening portion 13 which serves as the outlet port are formed to vary.

In the above-described second embodiment, the bottom wall portion 10 of the inner cylinder portion 4 is formed to be inclined with respect to the center axial line C3, but not being limited thereto, for example, a configuration may be employed in which the clamp 25 which serves as the movable piece is provided in the bottom wall portion 10 provided to be orthogonal to the center axial line C3.

In the above-described third embodiment, the opening areas of the inlet port and the outlet port of the second flow path R2 are constant in the first assembled state and in the second assembled state, but not being limited thereto, a configuration may be employed in which the opening areas of the inlet port and the outlet port of the second flow path R2 vary in the first assembled state and in the second assembled state, and a configuration in which the rib 30 which serves as the protrusion piece is provided in the bottom wall portion 10 of the inner cylinder portion 4.

In each of the above-described embodiments, a configuration is employed in which the ion exchanger 1 is installed such that the center axial line C1 of the communicating tube portion 2 is along the substantially horizontal direction and the center axial line C2 (the center axial line C3 of the inner cylinder portion 4) of the outer cylinder portion 3 is along the substantially vertical direction.

Not being limited thereto, for example, a configuration may be employed in which the ion exchanger 1 is installed such that the center axial line C1 of the communicating tube portion 2 is along the substantially vertical direction and the center axial line C2 (the center axial line C3 of the inner cylinder portion 4) of the outer cylinder portion 3 is along the substantially horizontal direction.

In addition, a configuration may be employed in which the ion exchanger 1 is installed such that the center axial line C1 of the communicating tube portion 2 is along the substantially horizontal direction and the center axial line C2 (the center axial line C3 of the inner cylinder portion 4) of the outer cylinder portion 3 is along the substantially horizontal direction.

In addition, a configuration may be employed in which the ion exchanger 1 is installed such that the center axial line C1 of the communicating tube portion 2 or the center axial line C2 (the center axial line C3 of the inner cylinder portion 4) of the outer cylinder portion 3 is inclined with respect to the horizontal direction or the vertical direction.

In addition, a configuration may be employed in which the communicating tube portion 2 and the outer cylinder portion 3 are formed to be integrated with each other such that the center axial line C1 of the communicating tube portion 2 and the center axial line C2 (the center axial line C3 of the inner cylinder portion 4) of the outer cylinder portion 3 intersect with each other in an inclined state.

In each of the above-described embodiments, a configuration is employed in which the ion exchanger 1 is installed such that the communicating tube portion 2 is positioned on the lower side and the outer cylinder portion 3 (inner cylinder portion 4) is positioned on the upper side, but not being limited thereto, a configuration may be employed in which the ion exchanger 1 is installed such that the communicating tube portion 2 is positioned on the upper side and the outer cylinder portion 3 (inner cylinder portion 4) is positioned on the lower side.

For example, a configuration may be employed in which the communicating tube portion 2 is formed to be integrated with the lid portion 5, and the lid portion 5 is assembled to the bottomed cylindrical outer cylinder portion 3 in a state where the inner cylinder portion 4 is stored, and accordingly, the upper end side (rear end side in the assembling direction) of the inner cylinder portion 4 protrudes to the inside of the communicating tube portion 2 and the inlet port, and the outlet port of the inner cylinder portion 4 in the communicating tube portion 2 are disposed.

However, as described in each of the above-described embodiments, the configuration in which the communicating tube portion 2 is provided below the outer cylinder portion 3 is preferable. In a case where the communicating tube portion 2 is provided below the outer cylinder portion 3, exchange work is easily performed without making the coolant 17 remain in the outer cylinder portion 3 when performing the exchange work of the ion exchange resin cartridge (the inner cylinder portion 4 and the lid portion 5).

The invention claimed is:

1. An ion exchanger used in a cooling system of a fuel cell system, comprising:
   a communicating tube portion of which both end portions are configured to be respectively connectable to a pipe of the cooling system, the communicating tube portion including a first flow path which allows coolant introduced from one side to pass therethrough to the other side;
   a case portion which is provided to communicate with the communicating tube portion;
   a storage body which is assembled to the case portion, has a second flow path in which a part of the coolant introduced to the communicating tube portion branches and flows from the communicating tube portion, and is merged with the communicating tube portion again, and stores an ion exchange resin in the second flow path; and a lid portion configured to block the case portion,
wherein:
an assembled state of the storage body with respect to the case portion is changeable into any of a plurality of possible assembled states,
a proportion of the coolant that flows to the second flow path is changeable by changing the assembled state of the storage body,
the storage body has a part assembled to protrude to the inside of the communicating tube portion, and includes an inlet port through which the coolant is introduced from the communicating tube portion to the second flow path at the protruding part and an outlet port through which the coolant is led out to the communicating tube portion from the second flow path,
the assembled state of the storage body is changeable by rotating the storage body by an angle regarding an assembling direction of the storage body with respect to the case portion as an axial center,
the communicating tube portion has a shape of a substantially straight line,
the communicating tube portion forms the first flow path,
the second flow path branches from the first flow path at a first point on the first flow path and rejoins the first flow path at a second point on the first flow path,
an opening area of the inlet port is different from an opening area of the outlet port; and
the inlet port and the outlet port are formed with a circumferential wall portion and a bottom wall portion of the storage body,
the ion exchange resin is a granular ion exchange resin,
when the ion exchanger operates to circulate the coolant, the ion exchange resin in the storage body is swept away to a downstream side of the storage body, and
the ion exchanger is configured to remove ions contained in the coolant by allowing the coolant to pass through an inside of the case portion that is filled with the ion exchange resin.

2. The ion exchanger according to claim 1, wherein an opening area of an inlet port through which the coolant is introduced to the second flow path from the communicating tube portion is changeable by changing the assembled state of the storage body.

3. The ion exchanger according to claim 1, wherein a communicating tube portion side end surface of the storage body, which protrudes to the inside of the communicating tube portion, is disposed to be inclined with respect to a flow path direction of the first flow path.

4. The ion exchanger according to claim 1, further comprising
a protrusion piece which is formed to protrude from the communicating tube portion side end surface of the storage body which protrudes to the inside of the communicating tube portion, wherein
the protrusion piece is changed between a state of being installed along the flow path direction of the first flow path and a state of being installed along a direction orthogonal to the flow path direction of the first flow path by the change of the assembled state of the storage body.

5. The ion exchanger according to claim 1, further comprising
a movable piece of which one end is pivotally supported to be rotatable and the other end is a free end on the communicating tube portion side end surface of the storage body which protrudes to the inside of the communicating tube portion, wherein
a free end side of the movable piece is changed between a state of being positioned further on the upstream side of the first flow path than a rotation axis side and a state of being positioned further on the downstream side of the first flow path than the rotation axis side by the change of the assembled state of the storage body.

6. The ion exchanger according to claim 1, further comprising
a positioning unit configured to determine a position of the storage body depending on each of the plurality of kinds of assembled states.

* * * * *